Sept. 1, 1964 P. ORTET ETAL 3,146,648
APPARATUS FOR EFFECTING ENGAGEMENT OF A TOOL WITH A WORK
PIECE DURING EACH WORK STROKE AND FOR AUTOMATICALLY
DISENGAGING THE TOOL DURING EACH RETURN STROKE
Filed May 29, 1962 3 Sheets-Sheet 1
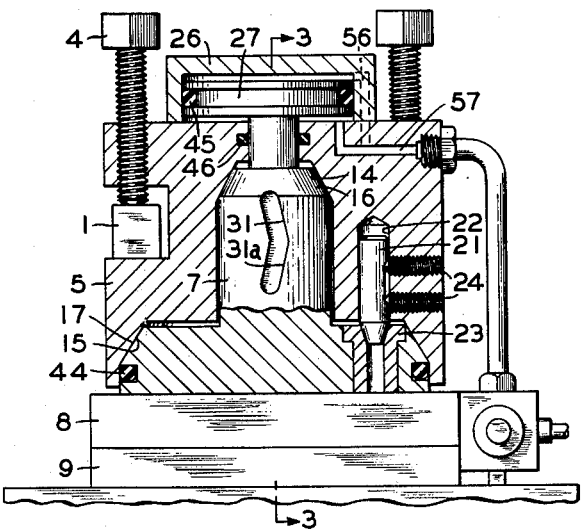
INVENTORS
PIERRE ORTET
ROGER MARCILLAUD
BY
ATTORNEY Sept. 1, 1964 P. ORTET ETAL 3,146,648
APPARATUS FOR EFFECTING ENGAGEMENT OF A TOOL WITH A WORK
PIECE DURING EACH WORK STROKE AND FOR AUTOMATICALLY
DISENGAGING THE TOOL DURING EACH RETURN STROKE
Filed May 29, 1962 3 Sheets-Sheet 2
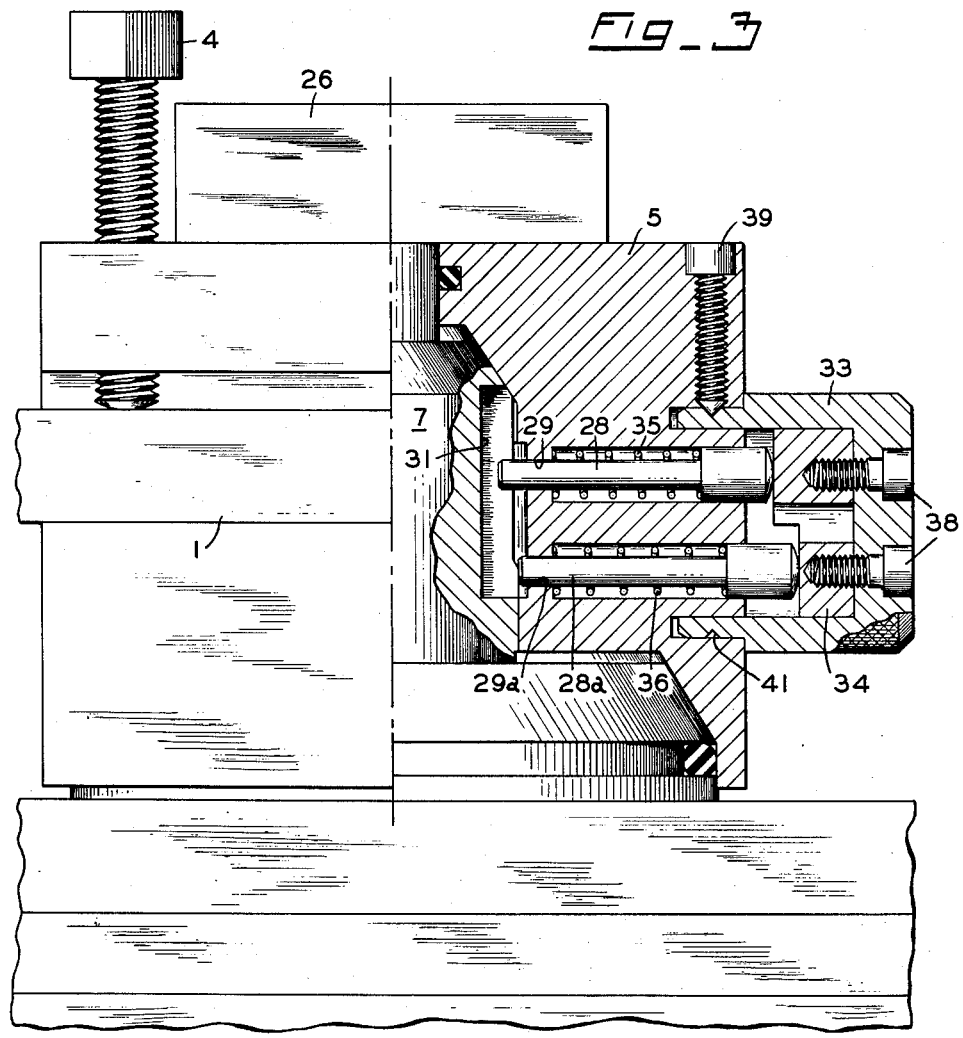
INVENTORS
PIERRE ORTET
BY ROGER MARCILLAUD
Ralph W. McIntire, J.
ATTORNEY

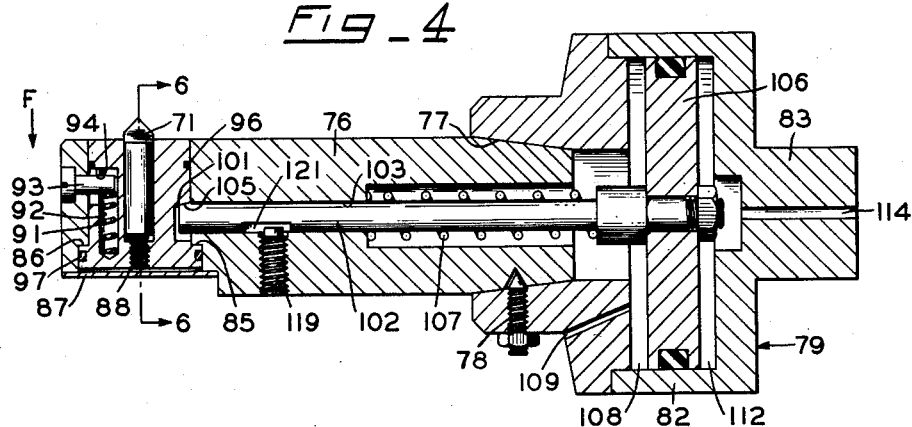
Fig_4
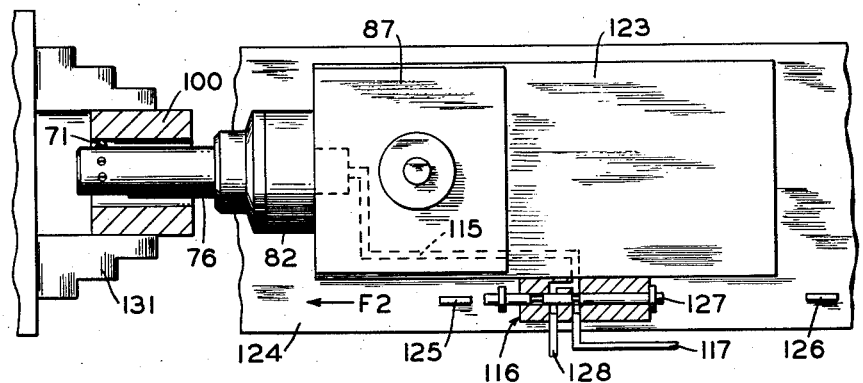
Fig_5
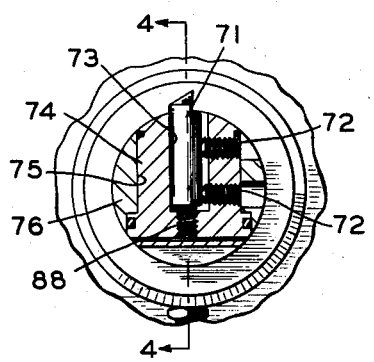
Fig_6
INVENTORS
PIERRE ORTET
BY ROGER MARCILLAUD
ATTORNEY United States Patent Office 3,146,648
Patented Sept. 1, 1964

3,146,648
APPARATUS FOR EFFECTING ENGAGEMENT OF A TOOL WITH A WORK PIECE DURING EACH WORK STROKE AND FOR AUTOMATICALLY DISENGAGING THE TOOL DURING EACH RETURN STROKE
Pierre Ortet and Roger Marcillaud, Clichy sous Bois, France, assignors to Compagnie des Freins et Signaux Westinghouse, Paris, France
Filed May 29, 1962, Ser. No. 198,486
Claims priority, application France June 5, 1961
5 Claims. (Cl. 82—24)

The present invention relates generally to means for automatically positioning a tool for engagement with a work piece at the beginning of each work stroke and for automatically positioning the tool for effecting disengagement of the tool from the work piece at the beginning of each return stroke, and relates specifically to such apparatus as operated by fluid pressure.

The object of this invention is to provide a fluid pressure operated mechanism of simple structure for automatically effecting engagement and disengagement of a tool with a work piece during the work stroke and return stroke, respectively of a cutting machine.

Generally stated, the present invention comprises a tool holder mounted upon a support for reciprocal movement thereon to carry a tool parallel to a work piece. The tool holder comprises a first member attached to the support and a second member adapted to carry a tool and attached to the first member for movement with respect thereto from one position to another, the one position effecting engagement of the tool with a work piece during the work stroke of the tool holder on its support, and the other position of the second member displacing the tool from the work piece in a direction perpendicular to the work piece to effect disengagement of the tool from the work piece during the return stroke of the reciprocal movement of the tool holder. The movement of the second member with respect to the first member is effected by a two-position pressure responsive means carried by the tool holder and operable in a first mode to move the second member of the tool holder to its one position, and operable in a second mode to move the second member of the tool holder to its other position. The operation of the presure responsive means is effected by a fluid pressure control system carried by the tool holder and including a two-position valve device operable in one position to control fluid pressure to effect operation of the pressure responsive means in its first mode upon engagement of the valve device with a first stop or limit means on the support at the end of the return stroke, and operable to the other position to effect operation of the pressure responsive means in its second mode upon engagement of the valve means with a second stop or limit means on the support means at the end of the work stroke.

The invention will be better understood from the following description and by examination of the attached drawings which show, as a non-limiting example two embodiments of a mechanism for automatically engaging and disengaging a cut-off tool according to the invention, and in which—

FIG. 1 is a sectional view taken along lines I—I of FIG. 2 showing the tool engaging and disengaging apparatus of one embodiment of the invention.

FIG. 2 is a plan view of the embodiment of FIG. 1.

FIG. 3 is a sectional view of the apparatus of FIG. 1 taken along the lines III—III of FIG. 1 on an enlarged scale.

FIG. 4 is a sectional view of another embodiment of the invention taken along the lines 4—4 of FIG. 6.

FIG. 5 shows in outline on a reduced scale the embodiment of FIG. 4 means mounted on a lathe, and FIG. 6 is a sectional view made along lines VI—VI of FIG. 4.

In the embodiment shown by FIGS. 1 and 2, the cutting tool 1 for dressing a piece of material 3 is fixed in the usual manner by pressure screws 4 in a turret 5.

The turret 5 is supported by a pivotal support 7 secured to a collar 8 fixed on a carriage 9 which is displaced in the direction of arrow F (see FIG. 2) on the lower carriage 11.

The centering of the turret 5 on the pivotal support 7 is assured by two female conical surfaces 15, 15 of said turret arranged to bear on two similar male conical surfaces 16 and 17 of the pivotal support.

The precise angular positioning of the turret, in working position of the tool is assured by a pin 21 located in a hole 22 parallel to the axis of the turret and the inner end of which is conical to engage in a corresponding conical hole provided in the upper part of a barrel in the lower part of the pivotal support 7. The pin 21 is maintained in place in its bore by two pressure screws 24, the ends of which are pointed to bear against corresponding cam surfaces provided on said pin which enables regulation with precision, the axial position of the pin in the turret.

The disengagement of the tool is assured by a combined raising and pivotal movement of the turret 5. For this purpose, the raising movement of the turret is assured by a control system, which in the example, is a pneumatic control system comprising a cylinder 26 fixed on the underside of the turret and in which is located a piston 27 connected to the pivotal support 7.

The pivotal movement of the turret is assured by the cooperation of a finger 28 (see FIG. 3) located in a radial hole 29 of the turret and the inner end of which is engaged in an angular groove (FIG. 1) milled in the cylindrical surface of the pivotal support 7. Thus, when the turret is raised, the finger 28 which is solid, causes it to pivot in the direction of the arrow F which assures disengagement of the tool.

According to actual operation, it may be necessary for disengagement of the tool to turn the turret in either one direction or the other. This is the reason for the second groove 31a inclined in the other direction and into which extends the end of the second finger 28a located in a radial hole 29a. Either of the fingers 28 or 28a may be selectively engaged into the corresponding groove, by means of a knurled engineer's button 33 which carries a cam 34 designed to depress, according to the one or the other of two 180° positions of said button 33, the one or the other of the two fingers 28 or 28a against the forces of the return springs 35 and 36. The cam 34 is fixed in the button 33 by screws 38 and the button 33 is held in place in the turret by a pointed screw 39, the end of which enters a groove 41 in the button.

The mechanism is sealed against leakage by a seal such as an O ring 44 located between the lower part of the pivot 7 and the corresponding interior cylindrical surface of the lower part of the turret 5.

Also the piston 27 is supplied with a seal 45 and the stem of this piston extends through a seal 46 located in an annular groove at the upper part of the turret.

The charging of the pneumatic jack is provided by a distribution valve designated as a unit by the numeral 48 providing an automatic disengagement of the tool at the end of its travel in either of the two directions.

For this purpose, the valve 48 comprises a supply of compressed air 51, two passageways connected to the atmosphere 52 and 53, and two supply ports 54 and 55 connected respectively to the two passageways 57 and 56 in communication with the lower side of the cylinder 26 and with the upper side of said cylinder respectively.

The stem 58 of the distribution valve is pushed alternately in one direction and then in the other by two stops 61 and 62 carried by the lower carriage 11 and located so as to strike said stem during the advance and return stroke of the tool respectively.

The operation of the mechanism is as follows:

The assembly is shown in the position where the tool begins to make a cutting pass over the face 2 of the piece 3, that is, that the tool is displaced in the direction of the arrow F (see FIG. 2). The compressed air which is supplied by the distributing valve by way of passageway 51 passes by a corresponding groove from the slide valve 58 by way of the port 54 and the passageway 57 to enter into the lower side of the cylinder under the piston 27 such that the turret is applied against the shoulder 17, the positioning pin 21 being entered into the thimble 23.

When the cutting operation is ended, the stem 58 of the distributing valve engages the stop 61 which pushes said stem such that the compressed air which is supplied by passageway 51 is now directed by the port 55 into the passageway 56 and to the upper side of the piston 27 while the bottom side of the cylinder is in communication by way of passageway 57 and the port 54 with the port 52 to the atmosphere of the valve by the corresponding undercut of the slide valve. The turret is then raised by the pneumatic jack and at the same time it produces a pivotal movement in the direction of the arrow F1 by the action of the finger 28 engaged in the annular groove 31 of the pivotal support.

The tool 1 completes its return course in the return direction of the arrow F and at the end of this course of return, the stem 58 of the distributing valve engages the stop 62 which returns the slide valve into the position shown in FIG. 2 by which compressed air is admitted by the passageway 57 under the piston 27 while the upper side of the piston is in communication with the atmosphere by the passageway 56 and the port 53 such that the turret is again applied in the position of work for the following stroke.

To machine the face in the opposite or other direction, the knurled button 33 (see FIG. 3) must be turned a half turn so as to put the finger 28a into active position in the place of the finger 28. In this condition, the movement of raising of the turret causes a pivotal movement in the reverse direction to that of the arrow F1 by the action of the finger 28a in the groove 31a inclined in the opposite direction to that of the groove 31.

In the embodiment of FIGS. 4 to 6 is shown a tool disengaging mechanism comprising a cutting tool 71 fixed by two screws 72 (FIG. 6) in a housing 73 of a piston 74 mounted so as to slide in a bore provided transversely in the interchangeable handle 76 of the tool holder. This latter is secured by a conical holding surface 77 secured by a pointed screw 78 in a body designated by the numeral 79 and comprising a portion 82 forming a pneumatic jack cylinder and a collar 83 designed to be applied in the turret 87 of a lathe (FIG. 5).

The working position of a tool is determined with precision by the engagement of an annular surface 85 of the piston 74 and of a similar surface 86 formed by an offset provided in the bore 75 of the holder 76. The bore 75 is closed at the opposite side to the tool by a plate 87 fixed in the holder 76 for example by screws. A certain clearance is provided between the interior plate 87 and the corresponding end of the piston 74 to permit the necessary return of the tool holder in its disengaged position.

Adjustment can be made with precision as to the longitudinal position of the cutting tool 71 in the piston 74 by means of a screw 88 mounted axially in the end of the piston and the end of which bears against the back end of the cutting tool 71.

The piston 74 is urged into the direction of engagement of the tool that is to say, the direction of the arrow F shown on FIG. 4, by a spring 91 located in a hole 92 in an axial direction in the piston 74, one end of the spring bearing on the bottom of the hole 72 and the other end against the end of a screw 93 mounted in the end of the holder 76 and passing across one groove 94 of the piston 74. The seals such as the O rings 96 and 97 located in annular grooves of the piston 74 seal off the exterior mechanism of this piston.

The piston 74 is brought into and maintained in working position of the tool by the action of an inclined end surface in the form of a cam 101 of a stem 102 mounted slidingly in an axial bore 103 of the holder 76. The cam 101 acts on a correspondingly inclined surface 105 of the piston 74.

The end of the stem 102 opposite to that of the cam 105 is attached to the piston 106 which is mounted in the cylinder 82 while a spring 107 urges axially the stem 102 in the direction which separates the cam 101 from the inclined surface 105 of the piston 74.

The pneumatic jack chamber 108 is connected to the atmosphere by a hole 109 while the chamber 112 of said jack is connected to a convenient source of compressed air means of the following path, passageway 114 of the shoulder 83, passage 115, the distributing valve designated in its entirety by the numeral 116 and the passageway 117.

The end of a round pointed screw 119 mounted radially in the holder 76 engages in a groove 121 of the stem 102 and serves to maintain said stem in proper position.

The turret 89 is supported by a movable carriage 123 in the direction of the arrow F2 (see FIG. 5) on a lower carriage 124 which carries two stops at the end of the course 125 and 126 located in the pathway of the stem 127 of the distributing valve 116.

The control valve 116 comprises a passageway 128 connected to the atmosphere such that according to the position occupied by the slide valve the pneumatic jack is either connected with the source of compressed air or connected to the atmosphere.

The operation of this mechanism is as follows:

The assembly is shown in operating condition, the cutting tool 71 executing a cut in the piece 100 set up, for example, in a jaw-chuck 131. Compressed air supplied by the control valve 126 into the pneumatic jack maintains the tool in the cutting position by the action of the pusher stem 102 which maintains the piston type tool holder 74 in its position in which its annular surface 85 bears against the annular surface 86 of the holder 76. The stop 125 is conveniently adjusted such that when the cutting stroke has been completed, the stem 127 of the control valve will come in contact with the stop and as a result will push toward the right (see FIG. 5) with respect to the body of the control valve 116. Under this condition the source of compressed air is cut off from the jack and the chamber 112 of said jack is connected to the atmosphere by the passageway 115 and the port 128 of the control valve. The spring 107 returns the piston 106 toward the right (see FIG. 4) such that the cam 101 of the stem 102 frees the piston 74 and this returns under the action of the return spring 91. The cutting tool 71 fixed in said piston returns then and no cutting will occur on the piece during the course of the return of the cutting tool in the direction opposite to that of the arrow F2 (see FIG. 5).

After the tool carriage has completed its return course, the stem 127 of the control valve is pushed by the stop 126 carried by the carriage 124 and is returned to the position shown on the drawing by which the pneumatic jack is supplied anew with fluid under pressure. The displacement of the piston 106 of this jack toward the left (FIG. 4) causes, by reason of the stem 102 and its cam 101, the return of the piston tool holder to its operating position.

It is intended that the invention be not limited to the embodiments described and shown which have been given as examples only and to which numerous modifications may be envisioned without departing from the scope of the invention as set forth in the appended claims.

Having now described the invention, what we claim as new and desire to secure by Letters Patent, is:

1. Apparatus for automatically effecting engagement of a tool with a work piece during each work stroke of a machine and for automatically disengaging the tool from the work piece during each return stroke of the machine, comprising:
   (a) a tool holder having a first member adapted to be attached to a support for reciprocal movement thereon, one direction of said movement comprising the work stroke and the other direction of said movement comprising the return stroke, and having a second member pivotally attached to said first member, said second member adapted to hold a tool and having a first pivotal relative position with respect to said first member for engaging said tool with a work piece during said work stroke and having a second pivotal relative position with respect to said first member for disengaging said tool from said work piece during said return stroke,
   (b) fluid pressure responsive means carried by said tool holder and operable in a first mode to move said second member to its first position and operable in a second mode to move said member to its second position, and
   (c) fluid pressure control means carried by said tool holder and operable in response to termination of the return stroke to control supply of fluid pressure to operate said pressure responsive means in its first mode and operable in response to termination of the work stroke to operate said fluid pressure responsive means in its second mode.

2. The apparatus of claim 1 in which said second member is attached to said first member for reciprocal sliding motion with respect to the first member in a direction perpendicular to said pivotal movement, said pressure responsive means including cam means disposed between said first and second members to effect the pivotal movement during the sliding movement.

3. The apparatus of claim 2 in which said cam means comprises radially disposed finger means attached to said second member slidably engaged in angularly disposed groove means in said first member.

4. The apparatus of claim 3 in which said groove means comprises two grooves disposed in relatively opposed angular directions with respect to said first member, and in which said finger means comprises a pair of spaced fingers each independently engageable with one of said grooves to effect pivotal movement of the second member in one direction or the other in response to a given mode of operation of said pressure responsive means, depending upon which finger is engaged in its corresponding groove.

5. The apparatus of claim 4 in combination with means operable to selectively engage said two fingers in the corresponding grooves.

References Cited in the file of this patent
UNITED STATES PATENTS

| | | |
|---|---|---|
| 2,097,096 | Groene | Oct. 26, 1937 |
| 2,903,933 | MacKenzie | Sept. 15, 1959 |
| 3,010,344 | Christensen | Nov. 28, 1961 |
| 3,011,368 | Hayes | Dec. 5, 1961 |